(12) United States Patent
Jung (10) Patent No.: US 11,819,967 B2
(45) Date of Patent: Nov. 21, 2023

(54) GUIDE DEVICE, PRECISION SUPPORT FOR A LINEAR RAIL AND ADJUSTING METHOD

(71) Applicant: DECKEL MAHO Pfronten GmbH, Pfronten (DE)

(72) Inventor: Robert Jung, Pfronten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 125 days.

(21) Appl. No.: 17/440,769

(22) PCT Filed: Dec. 13, 2019

(86) PCT No.: PCT/EP2019/085070
§ 371 (c)(1),
(2) Date: Sep. 18, 2021

(87) PCT Pub. No.: WO2020/200504
PCT Pub. Date: Oct. 8, 2020

(65) Prior Publication Data
US 2022/0176502 A1    Jun. 9, 2022

(30) Foreign Application Priority Data
Apr. 4, 2019  (DE) ..................... 10 2019 204 852.8

(51) Int. Cl.
*B23Q 1/01* (2006.01)
*F16C 29/00* (2006.01)
*F16C 29/12* (2006.01)

(52) U.S. Cl.
CPC ............ *B23Q 1/017* (2013.01); *F16C 29/001* (2013.01); *F16C 29/004* (2013.01); *F16C 29/005* (2013.01); *F16C 29/12* (2013.01)

(58) Field of Classification Search
CPC .... F16C 29/001; F16C 29/004; F16C 29/005; F16C 29/12; F16C 29/123; F16C 29/126
See application file for complete search history.

(56) References Cited

U.S. PATENT DOCUMENTS

| | | | | |
|---|---|---|---|---|
| 4,396,235 A | * | 8/1983 | Teramachi | F16C 29/004 384/44 |
| 5,845,996 A | | 12/1998 | Greubel et al. | |
| 7,101,083 B2 | * | 9/2006 | Ito | F16C 29/06 384/40 |
| 2006/0029309 A1 | | 2/2006 | Ito | |
| 2007/0065056 A1 | * | 3/2007 | Greubel | F16C 29/004 384/59 |

(Continued)

FOREIGN PATENT DOCUMENTS

| | | |
|---|---|---|
| DE | 4027637 A1 | 3/1992 |
| DE | 4301435 A1 | 7/1994 |

(Continued)

OTHER PUBLICATIONS

Translation of JP2000304040 obtained May 8, 2023.*

(Continued)

*Primary Examiner* — James Pilkington
(74) *Attorney, Agent, or Firm* — Henricks Slavin LLP (57) ABSTRACT

A guide device for a machine tool including a base body having at least one contact surface, a guide rail having at least one bearing surface and a guide axis, and a plurality of exchangeable support plates for positioning the guide rail on the base body.

18 Claims, 5 Drawing Sheets

(56) References Cited

U.S. PATENT DOCUMENTS

2014/0346304 A1    11/2014  Kim

FOREIGN PATENT DOCUMENTS

| | | |
|---|---|---|
| EP | 2172633 A1 | 4/2010 |
| JP | 63-032729 A | 3/1988 |
| JP | 01-185482 A | 7/1989 |
| JP | 2000-304040 A | 10/2000 |
| JP | 2002-295440 A | 10/2002 |
| JP | 2012-013138 A | 1/2012 |
| JP | 2012-180863 A | 9/2012 |
| JP | 2012-192461 A | 10/2012 |
| JP | 2016-185580 A | 10/2016 |

OTHER PUBLICATIONS

International Search Report dated Mar. 25, 2020 for PCT App. Ser. No. PCT/EP2019/085070.
Office Action dated Mar. 7, 2023 in JP App. Ser. No. 2021-5588886, with English translation.
Office Action dated Apr. 15, 2023 in CN App. Ser. No. 201980095247.7, with English translation.
Office Action dated Jun. 13, 2023 in EPO App. Ser. No. 19832862.7, with English translation.
Office Action dated Aug. 22, 2023 in JP App. Ser. No. 2021-558886, with English translation.

* cited by examiner

GUIDE DEVICE, PRECISION SUPPORT FOR A LINEAR RAIL AND ADJUSTING METHOD

CROSS-REFERENCE TO RELATED APPLICATIONS

This application is the U.S. national phase under 35 U.S.C. § 371 of PCT International Application No. PCT/EP2019/085070, which has an International filing date of Dec. 13, 2019, and claims the benefit of German Application No. 10 2019 204 852.8, filed Apr. 4, 2019.

The present invention relates to an improved guide device for a machine tool, an improved precision support for a linear rail and an adjustment method for adjusting a guide device of a machine tool.

Guide devices of the generic kind known from the prior art for machine tools usually require labor-intensive and costly machining of the contact surfaces for receiving the guide rails in order to achieve a desired accuracy in shape and position of the guide rail.

The accuracy of a machine tool depends, inter alia, on the accuracy of the linear movement of the axes. Linear guides (usually recirculating roller units consisting of rail and carriage) are attached to structural parts and, for example, pressed against a lateral stop. The linear guide is thus attached to the machine tool via the support surfaces. The straightness of the linear movement of an axis therefore depends directly on the manufacturing accuracy of the support and the stop of the structural part at which the rails are attached. To increase the accuracy of the guides, for example, the support surfaces of the structural parts at which the linear guide is attached are post-machined in complex manual work in order to achieve the desired accuracy.

For example, a method for attaching a linear guide rail to a base unit is known from DE 43 01 435 A1. The method proposes pre-fixing the linear guide rail at various spaced-apart adjustment points and pouring a hardenable filler into a space between the linear guide rail and the base unit. The linear guide rail may be fixed to the base unit by hardening the filler.

Based on the above prior art, it is an object of the present invention to provide a guide device and a precision support for a linear guide rail of a machine tool such that the accuracy of the machine tool can be increased in a simple and efficient manner. In addition, it is an object of the present invention to provide an adjusting method for setting the position of the guide rail, with which a high level of accuracy of the linear guide rail can be achieved in a simple and efficient manner so that the most precise linear movement possible along the linear guide can be guaranteed.

To achieve the above-mentioned objects of the present invention, the features of the independent claims are proposed. Dependent claims relate to preferred embodiments of the present invention.

According to an aspect of the invention, a guide device for a machine tool is proposed. The guide device includes a base body and a guide rail. The base body may be a structural part of a machine tool. The guide rail may have at least one bearing surface for mounting the guide rail on the base body and a guide axis (e.g., for a linear movement) and the base body may have at least one contact surface. In addition, a large number of exchangeable support plates are proposed according to the invention. The exchangeable support plates are provided for precise positioning (or mounting) of the guide rail on the base body. The support plates may be arranged (preferably in parallel to one another) along the guide axis for setting defined distances between the bearing surface of the guide rail and the contact surface of the base body. This configuration makes it possible to provide the plurality of support plates in parallel to one another along the guide rail, i.e., between the bearing surface of the guide rail and the contact surface of the base body. To set the position or location of the guide rail, it is possible to adjust the position and/or shape of the guide rail in sections, namely in the sections in which the respective exchangeable support plates are present, by replacing the respective support plates with appropriately adapted support plates. The support plates thus determine the exact position of the guide rail so that inaccuracies in the base body and/or the guide rail (e.g., manufacturing-related inaccuracies) can be compensated for by the adapted exchangeable support plates. Complex machining of the support surface on the base body is therefore no longer required fully since the exchangeable support plates rest on the contact surfaces of the base body and the guide rail in turn rests on the exchangeable support plates. Thus, with the optimally adapted exchangeable support plates, a high degree in accuracy of the shape and position of the guide rail can be achieved without the need for complex, extensive post-machining of the base body and/or the rail.

The support plates may be arranged along the guide axis according to their respective plate thickness in such a way that an accuracy deviation, such as a positional accuracy deviation or a shape accuracy deviation between an actual position and a target position of the guide rail and/or the base body, can be compensated and that guide rail resting on the support plates can be brought into a predetermined ideal guide position. By adjusting the plate thicknesses and/or the shape of the respective exchangeable support plates along the sections along the longitudinal axis of the guide rail, highly precise positioning of the guide rail is possible so that a guide device for highly precise linear movement can be provided.

A plurality of support sections may be present along the guide rail and a support plate may be provided in each support section and the distance between the guide rail and the base body in the respective support section may be adjusted via the thickness of the support plates provided in the support section.

Each support section may have an adapted exchangeable support plate which is adapted to equalize or compensate for deviations in shape (or tolerance deviations) of the part of the guide rail and the base body present in the respective support section.

The plurality of support plates comprise, for example, a plurality of horizontal support plates and a plurality of vertical support plates. The horizontal support plates are spaced apart and provided in parallel to one another along a horizontal contact surface of the base body. The horizontal support plates are preferably arranged spaced apart from one another. The vertical support surfaces may be provided in parallel to one another along the vertical contact surface on the base body. The vertical support plates are preferably in contact with one another. Advantageously, the base body has a vertical contact surface for receiving the vertical support plates and a horizontal contact surface for receiving the horizontal support plates. The vertical contact surface on the base body may, however, also be defined by an additional structural part on the base body. Due to the particularly advantageous configuration using horizontal support plates and vertical support plates, it is possible to achieve particularly precise positioning of the guide rail in a simple manner. In particular, the position of the guide rail may thus be fine-tuned both in the vertical and in the horizontal direction by appropriately adapting the respective horizontal and/or vertical support plates of the respective support section. A support section preferably comprises at least one horizontal support plate and one vertical support plate, which are further preferably in contact with one another.

The horizontal support plates may be provided for positioning the guide axis in a Z direction and the vertical support plates may be provided for positioning the guide axis in an X direction.

The horizontal support plates are advantageously each in contact with at least one vertical support plate.

The base body advantageously has cutouts on the support sections, respectively, so that the support plates can each be exchanged along the associated cutout. In particular, in a particularly advantageous development, the cutouts form a guide surface for guiding the support plates in a preferably horizontal direction up to a section under the guide rail. The cutouts thus form a guide for the support plate in a horizontal direction. Advantageously, the cutouts have a rectangular cross section.

The cutouts may form guides for inserting the respective support plates, in particular the horizontal support plates, in a region between the guide rail and the base body.

The guide rail may contact lateral pressure pieces on a first vertical side and contact vertical support plates on the opposite second vertical side, wherein the pressure pieces are preferably wedge-shaped and each have at least one bore. The guide rail may thus be fixed in the horizontal plane by the lateral pressure pieces and the vertical support plate. The pressure pieces each advantageously have at least one bore for receiving a screw for screwing the pressure pieces to a structural part of the base body or the base body or a side surface of the cutout of the base body. By screwing the pressure pieces to the base body and due to the wedge-shaped configuration of the pressure pieces, a force can be applied to the guide rail in the horizontal direction so that it can be pressed against the vertical support plate. Due to the wedge shape of the pressure pieces, a force can be applied to the guide rail in the horizontal direction.

The guide rail may be fixed to the base body by a screw connection and the horizontal support plates may be the spacer plates of the screw connection. Advantageously, the support plates may each be ground one-piece spacer plates and the guide rail may be a linear guide rail.

The support plates may be in direct contact with the contact surface of the base body and in direct contact with the bearing surface of the guide rail. Due to the support plates directly contacting the contact surface of the base body and the bearing surface of the guide rail, it is possible to adjust the accuracy deviations in the guide rail mounted on the base body by adapting the support plates.

A precision support for receiving a guide device on a base body of a machine tool may include a plurality of exchangeable support plates. The support plates may form support sections for contacting the guide device and may be positioned, preferably in parallel to one another, on the base body along a guide axis of the guide device. The support plates may each have a first support surface for contacting the guide device and a second support surface for contacting the base body. The support plates may preferably be provided for tolerance compensation between a bearing surface of the guide rail and a contact surface of the base body. The support plates may, for example, have an adapted thickness profile which is precisely adapted to the tolerance deviation in the associated support section. The thickness of the support plate may thus vary along the width of the plate.

Advantageously, in order to compensate for an accuracy deviation such as the shape accuracy or position accuracy of the guide rail and/or the base body, the support plates may be positioned along the guide axis according to their plate thicknesses so that the guide device mounted on the support plates assumes an ideal guide position. The thickness of the support plate may have a dimensional tolerance of less than or equal to 1 μm.

The support plates may each be formed in one piece and each support section may comprise an adapted exchangeable support plate which is adapted to compensate for deviations in shape of the region of the guide device and the base body present in the respective support section. For this purpose, the adapted support plate may have elevations and depressions on the surface in order to achieve exact shape compensation.

The first support surface and the second support surface of a support plate may be configured to be plane-parallel to each other, the maximum deviation of the distance between the first support surface and the second support surface may be less than or equal to 1 μm, and the surface of the first and/or second support surface is preferably ground.

The plurality of support plates may include horizontal support plates and vertical support plates. The horizontal support plates may be positioned spaced from and in parallel to one another along a horizontal contact surface of the base body, and the vertical support plates may be positioned in parallel to one another along a vertical contact surface of the base body.

The horizontal support plates may be spacer discs, each of which has an opening for receiving a fastening screw of the guide device.

A method for setting the position of a guide rail of a guide device may comprise at least the steps of: adjusting the position of the guide rail to a predefined position by adapting the shape of at least one support plate to an adapted shape and/or by replacing at least one support plate. This advantageous configuration makes it possible to bring the guide rail into an ideal position, with only the support plates in support sections in which a form deviation or an accuracy deviation of the base body and/or the guide rail has been determined having to be replaced or adapted. The method may additionally comprise the step of determining the position of the guide rail at a measuring position, for example using a measuring probe or a dial gauge.

Moreover, the method may be configured such that, in order to adapt the position of the guide rail, the distance between the base body and the guide rail is set by adapting the shape of at least one support plate to an adapted shape. Thus, the position of the guide rail may be adapted in sections by adapting the support plates. The position of the guide rail is preferably determined in a state in which the guide rail is attached to the base body using the support plates. After determining the position of the installed guide rail, the support plate may be replaced or adjusted in each of the regions in which a deviation in position has been determined according to the determined deviation. If, for example, a positive deviation is found in a vertical direction of the position of the guide rail, then for example the corresponding deviation can be removed from the support plate present in the support section in order to compensate for the deviation. In other words, the support plates may be adapted according to the determined deviation in position or shape of the guide rail in order to compensate for this deviation.

At least one support plate may be brought into an adapted shape by a machining manufacturing process, in particular by grinding to compensate for the shape and position tolerance of the base body and/or the guide rail.

To adjust the course of the guide axis to an ideal course, the distance between the guide rail and the base body may be adapted in sections by replacing at least one support plate with an adapted support plate, wherein the adapted support plate I adapted to compensate for deviations in shape of the part of the guide rail and the base body present in the respective support section.

In order to adjust the straightness and/or parallelism of the guide rail, the distance between the base body and the guide rail may be adjusted to an adapted shape by means of dimensional adaptation and/or shape adaptation of at least one support plate. The straightness and/or parallelism of the guide rail can thus be adapted to an ideal course.

In order to adapt the position of the guide rail in a vertical direction, the distance between the base body and the guide rail may be adjusted to an adapted shape by means of dimensional adaptation and/or shape adaptation of at least one horizontal support plate. In order to adapt the position of the guide rail in a horizontal direction, the distance between the base body and the guide rail may be adjusted to an adapted shape by means of dimensional adaptation and/or shape adaptation of at least one vertical support plate.

The method may further comprise the steps of fixing the guide rail in a horizontal direction by clamping the guide rail between lateral pressure pieces and the vertical support plates; and fixing the guide rail in a vertical direction by means of a screw connection at the base body, the horizontal support plates being spacer plates of the screw connection.

Advantageously, the method may further comprise the step of arranging support plates in sections along the guide axis, wherein the plate thicknesses of the support plates for each section are selected such that the guide rail approximates an ideal guide course.

A method for connecting a guide rail to a base body of a machine tool may comprise the steps of arranging support plates in the sections along the guide axis, the plate thickness of the support plates being selected for each section such that when the guide rail is screwed and/or clamped to the base body, a tolerance compensation takes place. In particular, a tolerance compensation of the tolerance of the guide rail and/or of the base body can be achieved by selecting the corresponding plate thickness of the support plates so that the guide rail approximates an ideal guide course in the installed state.

Use of a precision support to adjust the position of a guide rail fixed to a base body.

A method for adjusting the position of a guide rail on a base body of a machine tool, the method comprising the steps of: determining the position of the guide rail at a measuring position with a measuring probe; and adjusting the guide rail to a predefined position by dimensional adaptation and/or shape adaptation of at least one support plate at the measuring position to an adapted shape or by replacing at least one support plate.

According to a further embodiment of the invention, a precision machine tool with a guide device according to one of the preceding embodiments is proposed. By appropriately adapting the support plates, the position of the guide rail can be adapted in sections, at least in the vertical and horizontal directions.

In the following, exemplary embodiments of the present invention are described in detail with reference to the exemplary figures. The features of the exemplary embodiments may be combined in whole or in part and the present invention is in no way limited to the exemplary embodiments described. In the drawings, the same or similar features are labelled with the same reference symbols.

Figure 1:
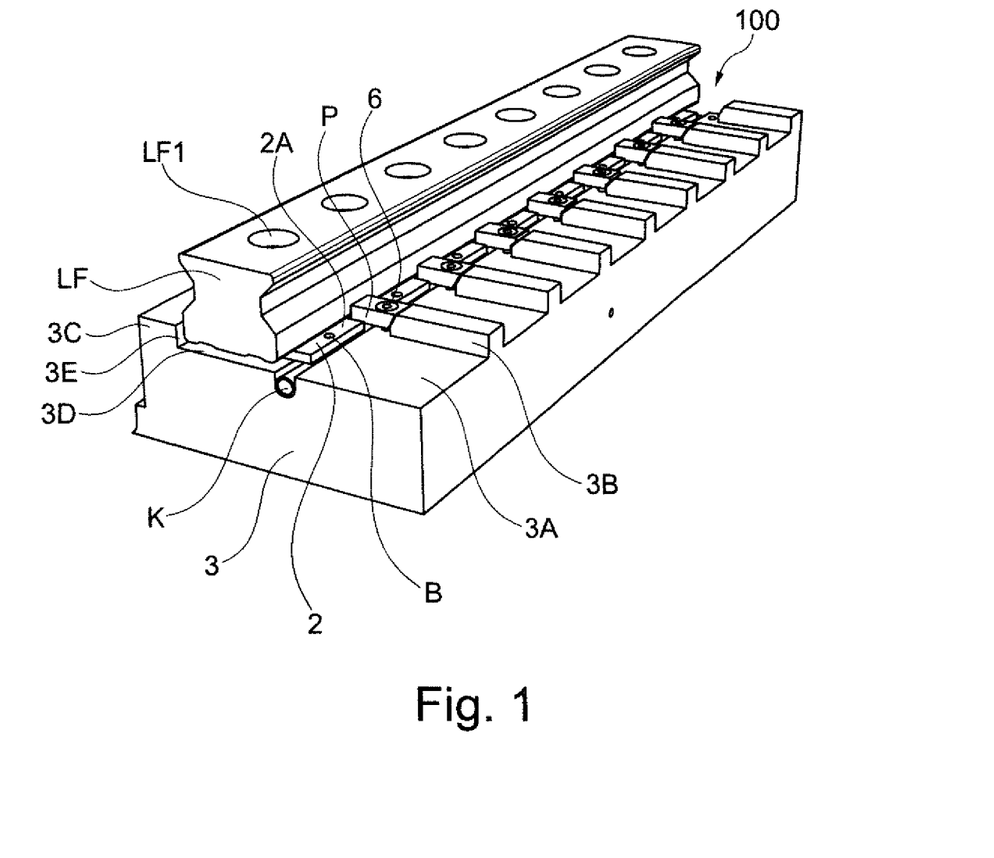
FIG. 1 shows a first view of the guide device.

In FIG. 1, the structure of a guide device for a machine tool is shown. The illustrated guide device comprises a precision support 100 consisting of a plurality of exchangeable support plates 1, 2 each forming support sections for making contact between the guide rail LF and the base body 3 of the machine tool.

In order to achieve high accuracies, for example, the entire guide supports may be ground in a complex manner. In order to avoid the complex and expensive post-machining of the guide supports, the present invention proposes the illustrated guide device having the precision support 100. The precision support with the plurality of exchangeable support plates 1, 2 can improve the straightness of the linear movement along the guide rail since manufacturing inaccuracies in the support and stop of the structural part on which the guide rails are attached can be compensated for by accordingly adapting the exchangeable support plates in sections.

Thus, the linear guide rail is mounted on, for example, ground (or scraped) support plates (tuning plates). In the finished state of the machine, the geometry may then be optimized by exchanging and/or adapting the support plates 1, 2 in individual rail sections. Thus, the guide device according to the invention allows for a substantial increase in the accuracy of the linear guide rail, which can be achieved without dismantling the entire rail or the table since only the individual support plates of the respective sections are exchanged. The guide accuracy of the linear guide rail can thus be greatly improved.

As shown in FIG. 1, the guide rail LF, which is preferably a linear guide rail, is positioned on the base body 3 by means of support plates 1, 2. In order to fix the guide rail LF, fastening bores LF1 (e.g., blind hole) through which fastening screws can be passed to screw the guide rail LF to the base body 3 are provided on the guide rail LF. Preferably, a support plate 1, 2 is assigned for each fastening screw 5 which is inserted through the respective fastening bore LF1. In other words, as shown in FIG. 1, eight openings are provided on the guide rail LF for eight fastening screws 5 for fastening the linear guide rail LF to the base body 3, for example.

Each of these fastening screws 5 is provided in the region of a support plate 2 which is a horizontal support plate. The horizontal support plates 2 each preferably have a bore through which the fastening screw 5 of the guide rail LF can be passed. By tightening the fastening screw 5, it is possible to fix the guide rail LF to the base body 3 by means of support plates 1, 2.

The horizontal support plates 2 each have a first and a second support surface 2A and 2B. Via these support surfaces 2A and 2B of the horizontal support plate 2, on the one hand the contact surface of the base body 3 is contacted and on the other hand the contact surface of the guide rail LF is contacted. In particular, the base body 3 has the horizontal contact surface 3D and the vertical contact surface 3E. As shown in FIG. 1, these contact surfaces preferably adjoin one another. The horizontal support plate 2 is placed on the horizontal contact surface 3D of the base body 3. The vertical support plates 1 are in turn brought into contact with the vertical contact surfaces 3E of the base body 3 in order to form a vertical contact surface for positioning and fixing the guide rail LF.

The horizontal support plates 2 may be removed from the support position via respective cutouts 3A of the base body 3. On the one hand, the cutouts 3A allow for easy insertion or removal of the horizontal support plates 2 and, on the other hand, precise guidance of the horizontal support plates during the insertion and removal process. The horizontal support plates 2 each have an opening or engagement bore B provided for the simplified removal of the horizontal support plates 2. In the region of the horizontal contact surface 3D of the base body 3, a cooling tube K is further provided along the guide rail LF for optimal cooling of the rail so that the temperature remains constant and temperature-related distortions are avoided.

As can be seen in FIG. 1, the guide rail LF is positioned on a plurality of horizontal support plates 2. In order to fix these horizontal support plates 2, the fastening screws 5 are passed through the fastening hole LF1 of the guide rail LF and fixed there.

In the initial configuration, the guide rail LF is mounted on uniform support plates, which are not yet adapted, on the base body 3. Then the guide rail may be measured. If a geometric deviation of the guide rail LF provided on the base body is determined, for example by determining the shape and position by means of a measuring probe M, the horizontal support plate 2 may be replaced in the relevant section and, for example, be replaced with a thicker or thinner or individually ground support plate in order to compensate for the deviation. It is thus possible to improve the positioning of the guide rail LF in specific sections without having to dismantle the entire guide rail.

Accordingly, it is possible to compensate for at least one vertical deviation of the guide rail LF by exchanging the horizontal support plates 2. Such a deviation can arise, on the one hand, due to the inaccuracies in the connection of the base body 3 to the guide rail LF and, on the other hand, due to manufacturing inaccuracies of the parts. To compensate for the tolerances and to adjust the position of the guide rail LF to an ideal position or location, the horizontal support plates 2 (and/or vertical support plate 1) may advantageously be exchanged and adapted in sections. As a result, it is possible to obtain a mounting of the guide rail LF in the vertical direction which is as close as possible to an ideal course so that a very high straightness of the guide rail LF can be achieved.

The base body 3, as shown in FIG. 1, also includes the projection 3C which forms the vertical contact surface 3E for contacting the vertical support plates 1. Similarly to the adjustment by exchanging the horizontal support plates 2, the vertical support plates 1 may also be exchanged accordingly in order to optimize the positioning of the guide rail LF in the horizontal plane or to compensate for the existing tolerances.

The fixation of the guide rail LF in the horizontal plane may be achieved via the pressure pieces P. As shown in FIG. 1, the pressure pieces P are provided in the region of the projections 3B of the base body 3. In particular on a preferably inclined side surface of the projection 3B of the base body 3, a pressure piece P which can be screwed to the base body 3 via a screw 6 is provided, respectively. The pressure piece P has one surface in contact with a vertical side surface of the guide rail LF and the opposite surface (preferably a wedge-shaped surface) in contact with an end surface of the projection 3B. The projections 3B of the base body 3 form the border between two adjacent cutouts 3A. The projections 3B with the respective pressure pieces P are arranged in parallel to one another along the longitudinal axis of the guide rail LF. By screwing the pressure piece P to the base body, a horizontal force is generated which presses the guide rail LF in the horizontal direction towards the projection 3C of the base body 3 or the vertical support plates 1 arranged in front thereof, as shown in FIG. 2.

Figure 2:
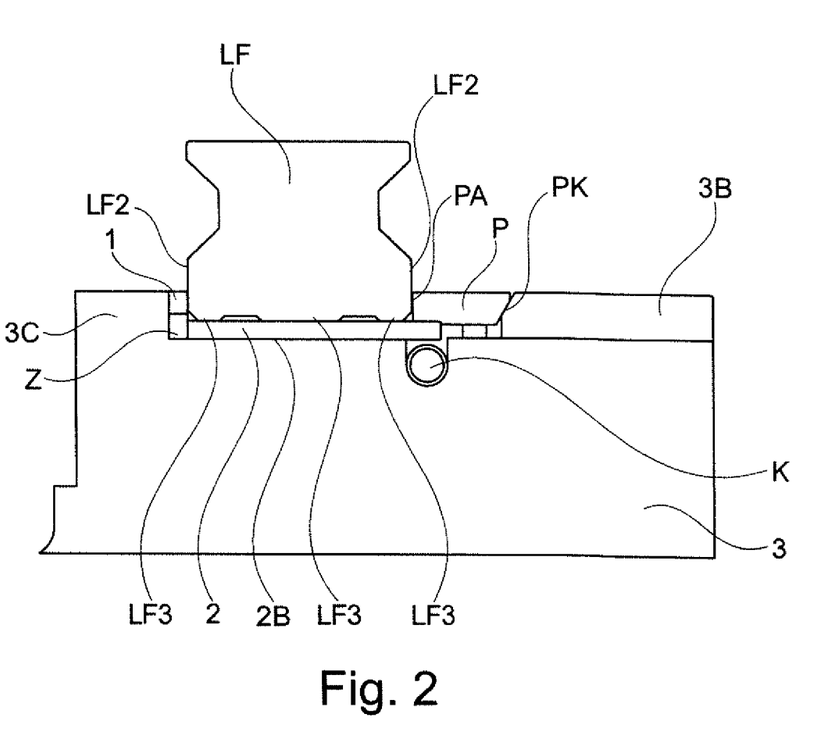
FIG. 2 shows a cross-sectional view of the guide device.

In FIG. 2 is a cross-sectional view of the guide device is shown. The horizontal support plates 2 are provided for vertical positioning or to compensate for the tolerances in the vertical direction. The first and second support surfaces 2A, 2B of the horizontal support plate 2 form the direct contact surfaces between the base body 3 and the guide rail LF. In the exemplary example in FIG. 2, the guide rail LF has, as a horizontal bearing surface LF3, three surfaces which are arranged in parallel to one another and extend along the longitudinal axis of the guide rail LF. These horizontal bearing surfaces LF3 are in contact with the (upper) support surface 2A of the horizontal support plates. The guide rail LF may be pressed onto the horizontal support plates 2 by the fastening screws 5 of the guide rail LF. The thickness or the thickness profile of the horizontal support plates 2 determines the vertical position of the guide rail LF. If, for example, there is a deviation in the vertical direction due to a determined amount of difference to the ideal position of the guide rail LF, the thickness of the horizontal support plates 2 may now be adapted according to the determined amount of difference in order to compensate for this difference. The guide rail LF may thus be brought into the ideal position in a simple manner. Advantageously, this is also done in sections so that a complete dismantling of the guide rail LF is superfluous.

For positioning the guide rail LF in the horizontal direction using the vertical support plates 1, a positioning of the guide rail LF in the horizontal plane is also possible by appropriately configuring the thickness of the vertical support plates or the exact shape of the vertical support plates. As shown in FIG. 2, vertical support plates 1 are provided between the guide rail LF and the projection 3C of the base body 3. The vertical contact surface 3E of the projection 3C of the base body 3 forms the first contact surface of the vertical support plate 1. On the opposite side, the vertical support plate 1 contacts the vertical bearing surface LF2 of the guide rail LF. On the opposite side of the guide rail LF, in turn, the pressure piece P contacts the vertical bearing surface LF2 of the guide rail with the pressure surface PA.

By screwing the pressure piece P, the guide rail LF is clamped or pressed and thus fixed in the horizontal direction. The horizontal clamping force of the pressure pieces P is obtained, for example, by providing an inclined side surface PK. This inclined side surface PK engages with the wedge-shaped surface of the projection 3B and, when the pressure pieces P are screwed to the base body 3, a horizontal clamping force is generated which fixes the guide rail LF between the lateral pressure piece P and the vertical support plate 1.

If a deviation in the position of the guide rail LF in the horizontal direction is determined, a suitable selection of the vertical support plates 1 can bring about a displacement of the guide rail LF in sections in order to ultimately bring the guide rail LF into an ideal position.

Figure 3:
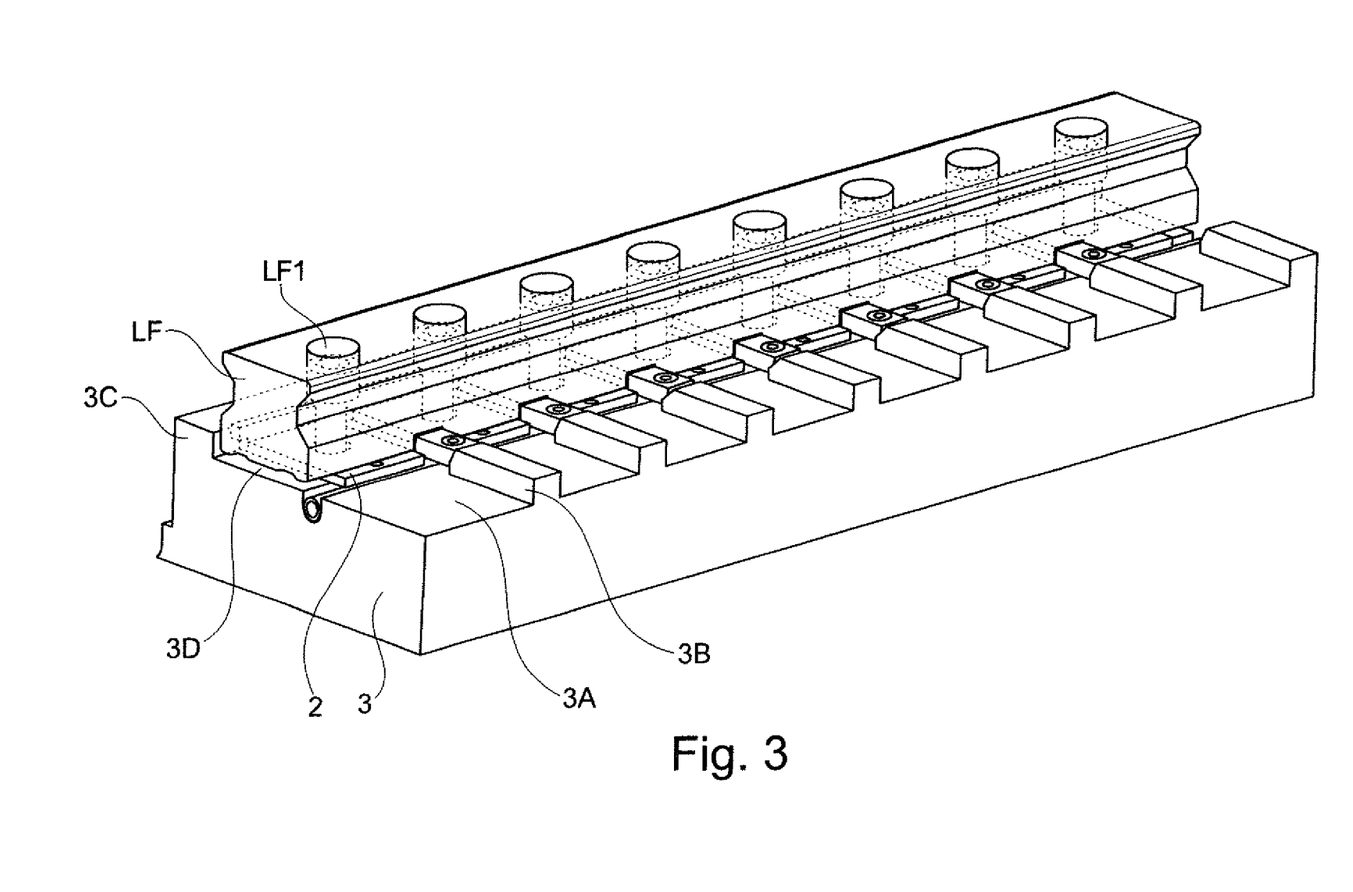
FIG. 3 shows a further perspective view of the guide device.

In FIG. 3, a further view of the guide device is shown. The guide rail LF has the fastening bores LF1 which are each associated with a horizontal support plate 2 in order to form a support section. To replace a horizontal support plate 2, these are pulled out of the intermediate region between the guide rail LF and the base body 3 via the cutout 3A after the fastening screw of the guide rail LF has been removed from the fastening bore LF1.

Figure 4:
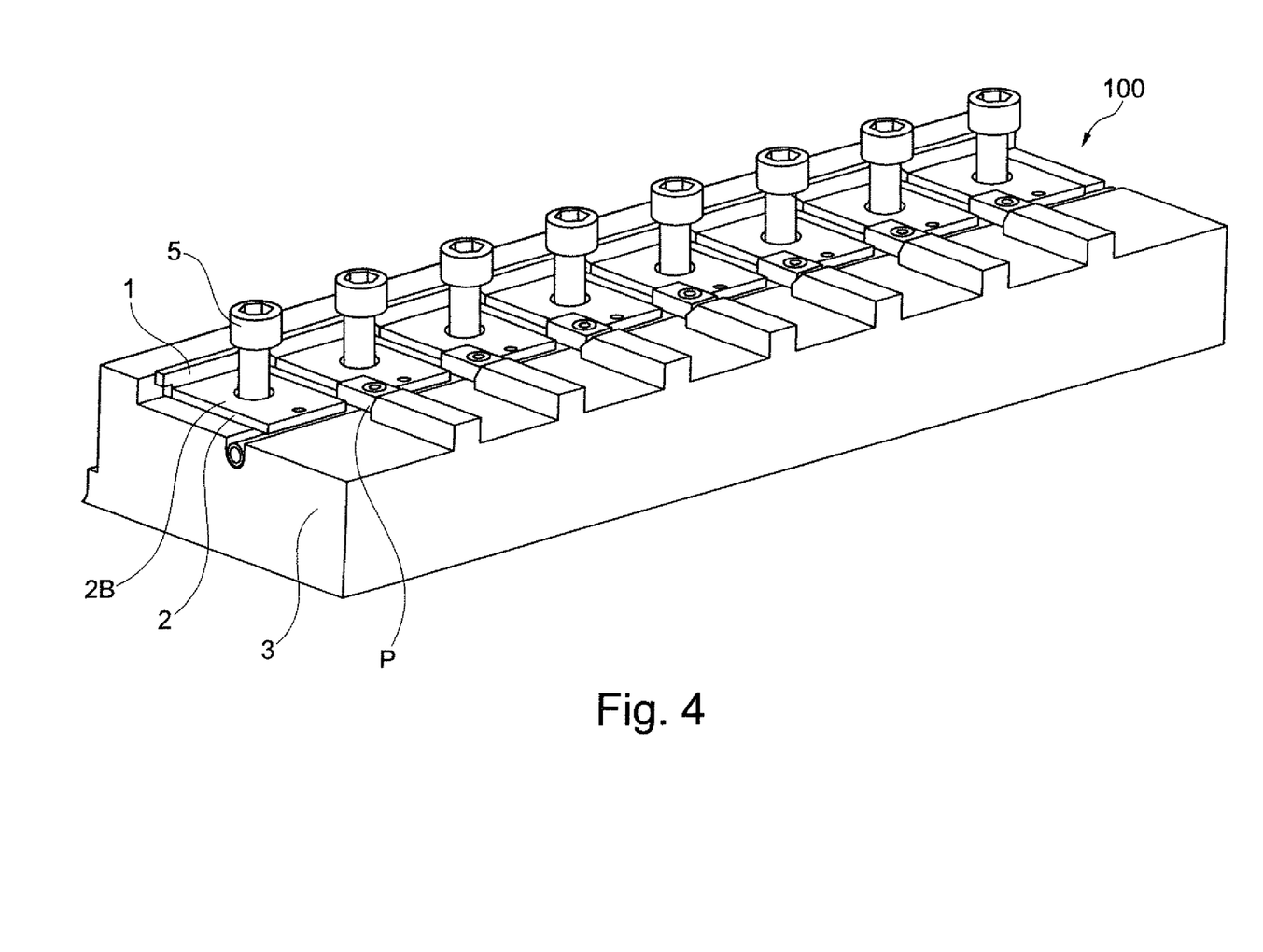
FIG. 4 shows the structure of the guide device with the guide rail removed.

FIG. 4 shows a diagram of the guide device with the guide rail LF removed to improve the illustration of the vertical and horizontal support plates 1, 2. As can be seen from FIG. 4, the fastening screws 5 are provided, which are usually used to fix the guide rail LF. These screws 5 are passed through openings in the horizontal support plates 2 in order to engage with the thread of the base body 3 and ultimately to fix the guide rail LF. The horizontal support plates 2 are used to position the guide axis in a Z direction and the vertical support plates 1 are used to position the guide axis in an X direction.

The horizontal support plates 2 are preferably rectangular plates which have a ground surface and are formed in one piece. Particularly advantageously, both the top side and the bottom side of the respective support plates may be ground. The horizontal support plates 2 also have a hole for easier removal of the plates from the intermediate space between the guide rail LF and the base body 3. Alternatively or additionally, further removal aids may also be provided, such as a dovetail guide.

Figure 5:
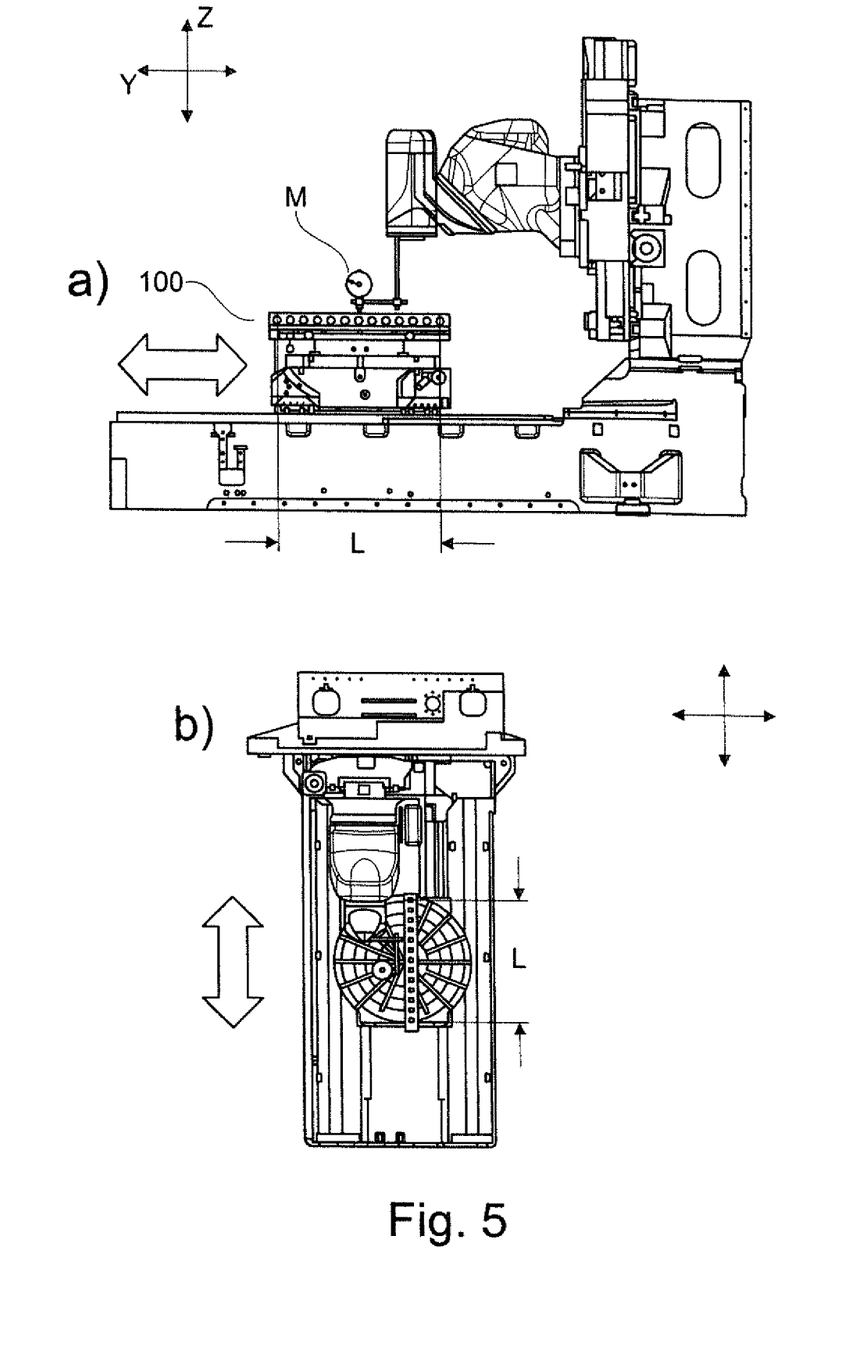
FIG. 5 shows a machine tool with a measuring probe for measuring a geometric deviation of the guide device.

FIG. 5 shows the exemplary determination of the accuracy deviation of a guide rail on a machine tool. For example, a measuring probe M, which can be moved along the guide rail LF in order to record deviations in shape, is provided.

In order to adjust the position of the guide rail, in a first step, for example, a measuring probe M may be moved to a measuring position on the guide rail, for example along the Y axis shown in FIG. 5. By determining the geometric deviation, it is then possible to adjust the position of the guide rail to a predefined ideal position by adapting at least one support plate to an adapted shape and/or by replacing at least one support plate. The support plate may be brought into an adapted shape, for example, by a machining manufacturing process, in particular by grinding, in order to compensate for the deviations in shape of the base body and/or the guide rail.

In particular, deviations in shape of the guide rail from the ideal position may be determined. These deviations may in turn be compensated for by appropriate configuration of the horizontal support plates. For example, the support plates may be made thinner in certain regions so that a vertical deviation of the guide rail can be compensated for. Local geometric errors in the straightness and/or parallelism of the guide rail may thus be compensated for.

With the help of the vertical and horizontal support plates, the guide rail may, for example, also be brought to a desired degree of pivoting or bending in order to achieve a local displacement of the guide rail. The support plates advantageously have flat surfaces both on the top side and bottom side and on all side surfaces. The vertical support plates 1 may preferably be configured without bores, particularly since a bore is superfluous because the fixation of the vertical support plates 1 is achieved by means of clamping using pressure pieces P.

By means of the present invention, it is thus possible to provide an advantageous guide device which can be easily adjusted in order to compensate for geometric inaccuracies, for example. In particular, it is thereby also possible to reduce the requirements for the manufacturing and assembly accuracy of the base body 3 and/or the guide rail.

Different shapes or profiles may be used as guide rails. For example, profiles for flat guides, dovetail guides, prism guides, etc. may be used. For example, rack elements of a rack and pinion system or other elongated components of a drive system may also be combined to form the guide device in accordance with the invention.

The invention claimed is:

1. A guide device for a machine tool, comprising
a base body (3) having at least one contact surface,
a guide rail (LF) having at least one bearing surface and a guide axis, and
a plurality of exchangeable support bodies (1; 2) for positioning said guide rail (LF) on said base body (3);
wherein the support bodies (1; 2) are arranged along the guide axis for setting defined distances between the bearing surface of said guide rail (LF) and the contact surface of said base body (3), and
wherein the plurality of support bodies (1; 2) comprise horizontal support bodies (2) and vertical support bodies (1) and the horizontal support bodies (2) are provided spaced apart from and in parallel to one another along a horizontal contact surface of said base body (3) and the vertical support bodies (1) are provided in parallel to one another along a vertical contact surface on said base body (3).

2. The guide device according to claim 1, wherein the support bodies (1; 2) are arranged according to their respective plate thickness along the guide axis such that an accuracy deviation in shape and/or position of said guide rail (LF) and/or said base body (3) is compensated for and said guide rail (LF) resting on said support bodies (1; 2) is in a predeterminable ideal guide position.

3. The guide device according to claim 1, wherein a plurality of support sections exist along said guide rail (LF) and a support body (1; 2) is provided in each support section and the distance between said guide rail (LF) and said base body (3) in the respective support section is determined by the thickness of the support plate (1; 2) provided in the support section.

4. The guide device according to claim 3, wherein said base body (3) has cutouts (3A) on the support sections, respectively, so that the support bodies (1; 2) are exchangeable along the cutouts (3A).

5. The guide device according to claim 1, wherein said guide rail (LF) is contacted with lateral pressure pieces (P) on a first vertical side and is contacted with the vertical support bodies (1) on the opposite second vertical side, and wherein the pressure pieces are wedge-shaped and have at least one bore.

6. The guide device according to claim 1, wherein the support bodies (1; 2) are each ground one-piece spacer plates and said guide rail (LF) is a linear guide rail.

7. A precision support (100) for receiving a guide device of a base body (3) of a machine tool, comprising
a plurality of exchangeable support bodies (1; 2) which form support sections for contacting the guide device and are positioned on said base body (3) along a guide axis of the guide device;
wherein the support bodies (1; 2) each have a first support surface for contacting the guide device and a second support surface for contacting said base body (3) and the support bodies (1; 2) are provided for tolerance compensation between a bearing surface of said guide rail (LF) and a contact surface of said base body (3), and wherein the plurality of support bodies (1; 2) comprise horizontal support bodies (2) and vertical support bodies (1) and the horizontal support bodies (2) are provided spaced apart from and in parallel to one another along a horizontal contact surface of said base body (3) and the vertical support bodies (1) are provided in parallel to one another along a vertical contact surface on said base body (3).

8. The precision support according to claim 7, wherein the support bodies (1; 2), for compensating for an accuracy deviation of the guide device and/or said base body (3), are positioned according to their plate thicknesses along the guide axis so that the guide device supported on the support bodies (1; 2) is brought into an ideal guide position.

9. The precision support according to claim 7, wherein the first support surface and the second support surface of a support body (1; 2) are formed plane-parallel to each other, and the and a maximum deviation of the distance between the first support surface and the second support surface is less than or equal to 1 μm, and the surface of the first and/or second bearing surface is ground.

10. The precision support according to claim 7, wherein the horizontal support bodies (2) are spacers which each have an opening for receiving a fastening screw (5) of the guide device.

11. A method for adjusting the position of a guide rail of a guide device for a machine tool, the guide device including a base body (3) having at least one contact surface, a guide rail (LF) having at least one bearing surface and a guide axis, and a plurality of exchangeable support bodies (1; 2) for positioning said guide rail (LF) on said base body (3), the support bodies (1; 2) being arranged along the guide axis for setting defined distances between the bearing surface of said guide rail (LF) and the contact surface of said base body (3), the method comprising:
adjusting the position of said guide rail (LF) to a predefined position by adapting the shape of at least one support body (1; 2) to an adapted shape and/or by replacing at least one support body (1; 2).

12. The method according to claim 11, wherein, for adjusting the position of said guide rail (LF), the distance between said base body (3) and said guide rail (LF) is set by adapting the shape of at least one support body (1; 2) to an adapted shape.

13. The method according to claim 11, wherein the at least one support body (1; 2) is brought into an adapted shape by a machining manufacturing process, to compensate for the shape and the positional tolerance of said base body (3) and/or said guide rail (LF).

14. The method according to claim 11, wherein, for adjusting a course of the guide axis to an ideal course, the distance between said guide rail (LF) and said base body (3) is adjusted in sections by replacing at least one support body (1; 2) with an adapted support body (1; 2), the adapted support body (1; 2) being adapted to compensate for deviations in shape of the part of said guide rail (LF) and said base body (3) present in the respective support section.

15. The method according to claim 11, wherein, for adjusting the position of said guide rail (LF) in a vertical direction, the distance between said base body (3) and said guide rail (LF) is set by adapting the shape of at least one horizontal support body (1; 2) to an adapted shape and wherein, for adapting the position of said guide rail (LF) in a horizontal direction, the distance between said base body (3) and said guide rail (LF) is set by adapting the shape of at least one vertical support body (1; 2) to an adapted shape.

16. The method according to claim 15, comprising the steps of:
fixing said guide rail (LF) in a horizontal direction by clamping said guide rail (LF) between lateral pressure pieces (P) and the vertical support bodies (1); and
fixing said guide rail (LF) in a vertical direction by means of a screw connection on said base body (3), wherein the horizontal support bodies (2) are spacer plates of the screw connection.

17. A method for connecting a guide rail (LF) to a base body (3) of a guide device according to claim 1, comprising:
placing support bodies (1; 2) in sections along the guide axis, wherein a plate thickness of the support body (1; 2) is selected for each section in such a way that tolerance compensation takes place when said guide rail (LF) is screwed and/or clamped to said base body (3).

18. A method for adjusting the position of a guide rail (LF) on a base body (3) of a guide device for a machine tool, the guide device including a base body (3) having at least one contact surface, a guide rail (LF) having at least one bearing surface and a guide axis, and a plurality of exchangeable support bodies (1; 2) for positioning said guide rail (LF) on said base body (3), the support bodies (1; 2) being arranged along the guide axis for setting defined distances between the bearing surface of said guide rail (LF) and the contact surface of said base body (3), the method comprising:
determining the position of said guide rail (LF) at a measuring position with a measuring probe, and
adjusting the position of said guide rail (LF) to a predefined position by adapting at least one support body (1; 2) at the measuring position to an adapted shape and/or by replacing at least one support body (1; 2).

* * * * *